United States Patent [19]

Yamada et al.

[11] Patent Number: 4,933,082

[45] Date of Patent: Jun. 12, 1990

[54] GAS-PERMEABLE LAMINATE

[75] Inventors: Takeyoshi Yamada; Kazumi Iwata, both of Iwakuni, Japan

[73] Assignee: Teijin Limited, Osaka, Japan

[21] Appl. No.: 336,543

[22] Filed: Apr. 12, 1989

Related U.S. Application Data

[63] Continuation of Ser. No. 941,526, Dec. 17, 1986, abandoned, which is a continuation of Ser. No. 695,245, Jan. 28, 1985, abandoned.

[30] Foreign Application Priority Data

Jan. 30, 1984 [JP] Japan ................................. 61-13443

[51] Int. Cl.$^5$ ............................................. B01D 13/00
[52] U.S. Cl. ............................... 210/490; 210/500.38
[58] Field of Search ............... 55/16, 158; 210/500.38, 210/489, 490, 491, 654, 500.37, 500.21

[56] References Cited

U.S. PATENT DOCUMENTS

| | | | |
|---|---|---|---|
| 3,676,335 | 7/1972 | Lacey et al. | 210/641 |
| 3,980,456 | 9/1976 | Browall | 55/16 |
| 4,187,086 | 2/1980 | Walmet et al. | 55/158 X |
| 4,214,020 | 7/1980 | Ward et al. | 55/158 |
| 4,230,463 | 10/1980 | Henis et al. | 55/16 |
| 4,406,673 | 9/1983 | Yamada et al. | 55/16 |
| 4,645,602 | 2/1987 | Barnes, Jr. et al. | 210/500.38 X |

*Primary Examiner*—Frank Spear
*Attorney, Agent, or Firm*—Wenderoth, Lind & Ponack

[57] ABSTRACT

A gas-permeable laminate for separating a specific gas from a gaseous mixture comprising a gas-permeable membrane having excellent selectivity for the specified gas and a porous support supporting said membrane, said gas-permeable membrane being a multilayer laminated membrane comprising at least a first and a second ultrathin membrane having excellent selectivity for the specified gas and a third ultrathin membrane of a different material from the materials of the first and second ultrathin membranes and located between the first and second ultrathin membranes, the material of the third ultrathin membrane having a higher permeation coefficient with respect to the specified gas than the materials of the first and second ultrathin membranes.

11 Claims, No Drawings

GAS-PERMEABLE LAMINATE

This application is a continuation of now abandoned application Ser. No. 941,526 filed Dec. 17, 1986, which is a continuation of now abandoned application Ser. No. 695,245 filed Jan. 28, 1985.

This invention relates to a gas-permeable laminate for separating a specific gas from a gaseous mixture, and more specifically to a gas-permeable laminate having excellent permeability and selectivity.

In recent years, there has been a remarkable advance in the technology of separating gases by membranes. One desired goal of the method of gas separation by membranes is to obtain the largest possible amount of a desired gas by using as compact a device as possible. Generally, the amount of a gas which permeates through a homogeneous membrane is given by the following equation.

$$q = \{P \times (p_1 - p_2) \times A\}/l$$

where q is the permeating speed, in cc (STP)/sec, of the gas;
$P_2$ is the permeation coefficient, in cc (STP).cm/cm$^2$.sec.cmHg, of the gas;
$p_1 - p_2$ is the difference, in cm Hg, between the partial pressures on both surfaces of the membrane;
A is the area, in cm$^2$, of the membrane, and
l is the thickness, in cm, of the membrane.

Accordingly, to maximize the amount of gas permeation in a compact device, it is absolutely necessary to minimize the thickness of the membrane. Various methods of preparing ultrathin membranes have, therefore, been proposed to date. They include a method involving coating and drying a polymer solution [for example, R. L. Riley, et al., J. Appl. Polymer Sci., 22, 255 (1973)], a water surface spreading method in which a polymer solution is spread on a water surface and the solvent is then evaporated (see Japanese Laid-Open Patent Publications Nos. 89,564/1976 and 92,926/1981), a method of film formation by plasma polymerization (see Japanese Laid-Open Patent Publications Nos. 30,528/1982 and 150,423/1982), and a method of film formation by in situ polymerization on a porous support (see U.S. Pat. Nos. 4,039,440 and 4,277,344).

Separation membranes prepared by these methods generally have a thickness of less than 1 micrometer, and the water-surface spreading method can relatively easily give membranes having a thickness of less than 0.1 micrometer.

These ultrathin membranes are used in the form of a so-called composite membrane on a porous film support.

As such membranes become thinner, they have lower strength and become readily breakable. Breakage occurs not only during membrane formation, but also by external factors, for example the adhesion of dirt in the air to the surface of the porous support or by the defects of the porous support itself.

In particular, the surface of the porous support is essentially uneven because it consists of pores and non-porous portions. Furthermore, the non-porous portions are not truly flat and have more or less raised and depressed portions. To completely prevent adhesion of dirt and other foreign matter on the surface of the porous support is therefore very difficult. When a thin film, especially one having a thickness of less than 0.1 micrometer, is laminated to the porous support and pressure is exerted on it, the thin film tends to conform to the raised and depressed portions of the surface of the support and is frequently broken by these portions.

In an attempt to prevent such damage of the thin film, a method has already been proposed which comprises covering the thin film with a sealing material (see U.S. Pat. No. 3,980,456 and the corresponding Japanese Laid-Open Patent Publication No. 121,485/1976). These patent documents state that by laminating a thin film of a sealing material composed solely of organopolysiloxane-polycarbonate copolymer as a protective layer onto a gas-permeable thin film composed of a copolymer of 80% by weight of polyphenylene oxide and 20% by weight of an organopoly-siloxane-polycarbonate copolymer, a membrane free from substantial damage can be formed. The sealing material, however, can prevent damage only when the gas-permeable thin film itself has little defects. If the thickness of the separation membrane is further reduced, or a support having large raised and depressed portions on its surface is used, the defects of the gas-permeable thin film itself increase. The defects can be remedied only imperfectly by sealing with the organopolysiloxane-polycarbonate copolymer, and the inherent performance of the separation membrane cannot be exhibited.

Taking an oxygen/nitrogen separation membrane as an example, assume that a permselective thin film is prepared from a material having an oxygen/nitrogen selectivity of 4 and covered with a sealing material composed of the organopolysiloxane-polycarbonate copolymer (having an oxygen/nitrogen selectivity of 2.2) to remedy the defects of the thin film. If the permselective thin film has little defects, the proportion of the gas which permeates only through the sealing material without passing through the thin permselective film is small, and the separation membrane can exhibit a selectivity close to the inherent selectivity of the thin film. However, if the thin film has many defects, the proportion of the gas which passes only through the sealing material increases relatively, and the separation membrane as a whole has a selectivity near 2.2.

Laminated membranes including ultrathin films are described elsewhere.

Japanese Laid-Open Patent Publication No. 41,958/1975 discloses in Example 3 a laminated film composed of a porous support, three films of an organopoly-siloxane-polycarbonate copolymer supported on the support, and a film of a mixture of poly(2,6-dimethyl phenylene oxide) and the organopolysiloxane-polycarbonate copolymer superimposed further thereon.

U.S. Pat. No. 3,874,986 discloses a laminated membrane composed of a porous support, an ultrathin film of the organopolysiloxane-polycarbonate copolymer laminated to the support, and an ultrathin film of polyphenylene oxide superimposed further thereon.

Japanese Laid-Open Patent Publication No. 59,214/1984 discloses a gas separation composite membrane composed of a porous film, a first film of a material having a $P_{O_2}/P_{N_2}$ of 2 to 2.5 and a $P_{O_2}$ of to $10^{-8}$ $10^{-7}$ cc-cm/cm$^2$-sec-cmHg and a second film of a material having a $P_{O_2}/P_{N_2}$ of 3 to 6 and a $P_{O_2}$ of $10^{31}$ $^{10}$ to $10^{-8}$ cc-cm/cm$^2$-sec-cmHg further thereon.

Japanese Laid-Open Patent Publication No. 62,303/1984 discloses an oxygen separation and enriching membrane composed of a porous supporting film and a highly siloxane-modified fluorine polymer film and a lowly siloxane-modified fluorine polymer film laminated thereto in this sequence.

Japanese Laid-Open Patent Publication No. 112,802/1984 discloses a gas-permselective membrane composed of a porous support and two film layers of a silicone-type polymer A such as polydimethylsiloxane and a polymer B having a glass transition temperature higher than ordinary temperature such as a polyolefin.

Japanese Laid-Open Patent Publication No. 301/1984 discloses a gas-permselective composite membrane composed of a polymeric film having high selectivity such as a polyphenylene oxide film and films of a ternary silicone copolymer having excellent gas permeability with said polymeric film interposed therebetween.

Japanese Laid-Open Patent Publication No. 59,210/1984 discloses a three-layer gas-permselective composite membrane composed of an interlayer (second layer) of a first polymer having a $P_{O2}/P_{N2}$ of at least 3.0 such as polyphenylene oxide, a top first layer of a second polymer having a higher gas permeability than the first polymer, a glass transition temperature of not more than 20° C. and excellent film-formability, such as a polyolefin, and a bottom third layer of a film of a silicone polymer or polydimethylsiloxane or the second polymer.

Japanese Laid-Open Patent Publication No. 66,308/1984 discloses a gas-permeable composite membrane composed of a porous support, a first easily-permeable layer shutting off the surface pores of the porous support, such as polydimethylsiloxane, a selection layer of a polymer having excellent selectivity, such as polyphenylene oxide, formed on the surface of the first easily-permeable layer, and a second easily-permeable layer, such as polydimethylsiloxane, formed on the surface of the selection layer.

Finally, Japanese Laid-Open Patent Publication No. 223,411/1983 discloses a gas permselective composite membrane composed of films of a first polymer having excellent gas permeability and a film of a second polymer having high selectivity interposed between the films of the first polymer.

It is an object of this invention therefore to provide a novel gas-permeable laminate.

Another object of this invention is to provide a gas-permeable laminate which achieves improved gas permeability and selectivity with good balance by laminating films of different materials.

Still another object of this invention is to provide a gas-permeable laminate having higher mechanical strength and permeability than that of a single film of a single material.

Yet another object of this invention is to provide a gas permeable laminate having excellent gas-permeability and selectivity which shows high mechanical strength and does not break by deformation even when it has a porous support having a non-smooth surface that allows a gas permeable thin membrane placed thereon to undergo deformation conforming to its non-smooth condition.

A further object of this invention is to provide a gas-permeable laminate having excellent gas permeability which has a high ratio of pores extending from its one surface to the other and having a very small average pore diameter and a porous support having a non-smooth surface, and which minimizes the hampering of gas permeation by the non-porous portion of the porous support.

Other objects and advantages of this invention will become apparent from the following description.

According to this invention, these objects and advantages are achieved by a gas-permeable laminate for separating a specific gas from a gaseous mixture comprising a gas-permeable membrane having excellent selectivity for the specified gas and a porous support supporting said membrane, said gas-permeable membrane being a multilayer laminated membrane comprising at least a first and a second ultrathin membrane having excellent selectivity for the specified gas and a third ultrathin film of a different material from the materials of the first and second ultrathin membranes and located between the first and second ultrathin membranes, the material of the third ultrathin film having a higher permeation coefficient with respect to the specified gas than the materials of the first and second ultrathin membranes.

The gas-permeable laminate of this invention comprises the gas-permeable laminated membrane consisting of at least three layers of ultrathin membranes and the porous support supporting the laminated membrane.

The laminated membrane consists of at least a first and a second ultrathin membrane having excellent selectivity for a specified gas and a third ultrathin membrane of a different material from the materials of the first and second ultrathin membranes and located between the first and second ultrathin membranes. The material of the third ultrathin membrane has a higher permeation coefficient with respect to the specific gas than the materials of the first and second ultrathin membranes.

For example, when oxygen-enriched air is to be produced by concentrating oxygen in air, the first and second ultrathin membranes may be made of a material having high selectivity for oxygen, such as a poly(methylhexene-allyltrimethylsilane) copolymer, polyphenylene oxide, poly(4-methylpentene-1) and poly(allyl t-butyldimethyl-silane-allyltrimethylsilane)copolymer, and the third ultrathin membrane may be made of a material having a higher oxygen permeation coefficient than the materials of the first and second ultrathin membranes, such as poly-dimethylsiloxane-polybutadiene copolymer and organopoly-siloxane-polycarbonate copolymer. When the material of the interlayer has a lower oxygen permeation coefficient than the material of the outside layers, for example when the interlayer is composed of an ultrathin membrane of poly-(methylhexene-allyltrimethylsilane) copolymer or poly(4-methylpentene-1) and is sandwiched between ultrathin membranes of organopolysiloxane-polybutadiene copolymer, oxygen-enriched air having a high oxygen concentration cannot be obtained as will be shown hereinbelow by a comparative example. The reason for this is not entirely clear. Judging, however, from the fact that oxygen-enriched air having a high oxygen concentration can be obtained from air by the gas permeable laminate of this invention composed of the same combination of materials, it is thought that in the comparative laminate, the organopolysiloxane-polybutadiene which is in direct contact with the porous support causes great deformation to the interlayer and breaks it when deformed along the surface of the porous support, and as a result, the comparative laminate does not give oxygen-enriched air having a high oxygen concentration.

The first and second ultrathin membranes used in the gas-permeable laminate of this invention may be made of known materials having excellent selectivity to a specific gas. When the specific gas is oxygen for example, the materials of the first and second ultrathin membranes are preferably an addition polymer of at least one unsaturated compound selected from hydrocarbon compounds and silane compounds which have a polymerizable carbon-carbon double or triple bond or a polyphenylene oxide. One or more polymerizable carbon-carbon double or triple bonds may be present in each molecule. When two or more such unsaturated bonds exist, they may be conjugated or non-conjugated.

Such unsaturated hydrocarbon compounds are preferably unsaturated hydrocarbons having 4 to 20, particularly 5 to 15, carbon atoms. Specific examples include hydrocarbons having a non-conjugated unsaturated bond such as butene, isobutene, pentene, methylpentene, hexene, cyclohexylpentene, styrene, heptene, methylhexene, methylacetylene, t-butylacetylene and t-butylmethylacetylene, and hydrocarbons having a conjugated unsaturated bond such as butadiene, isoprene and cyclooctadiene.

Preferred unsaturated silane compounds are those having 5 to 20, particularly 5 to 13, carbon atoms such as allyltrialkylsilanes, vinyltrialkylsilanes and trialkylsilylacetylenes. Specific examples include allyltrimethylsilane, allyl-t-butyldimethylsilane, allyloctyldimethylsilane, vinyltrimethylsialne and methyltrimethylsilylacetylene.

The addition polymers of the above unsaturated compounds include homopolymers of the above unsaturated compounds and copolymers such as random, block or graft copolymers of these compounds, and mixtures of these polymers. Specific examples of the addition polymers are polypentene, polymethylpentene, polyhexene, polymethylhexene, polybutadiene, polyisoprene, polyvinyltrimethylsilane, poly(methylhexene-allyltrimethylsilane) copolymer poly(allyl-t-butyldimethylsilane-allyltrimethylsilane) copolymer and polymethyltrimethylsilylacetylene. Of these, polymethylpentene, polymethylhexene, polybutadiene, polyisoprene, poly(methylhexene-allyltrimethylsilane) copolymer and poly(allyl t-butyldimethylsilane-allyltrimethylsilane) copolymer are preferred. Poly(methylhexene-allyltrimethylsilane) copolymer, poly(allyl t-butyldimethylsilane-allyltrimetylsilane) copolymer, and polymethylpentene are especially preferred.

The polyphenylene oxide includes a homopolymer and copolymers having the following recurring units

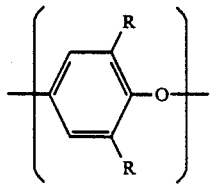

wherein R is an alkyl group having 1 to 4 carbon atoms, an amino group or a dialkyl amino group having 1 to 5 carbon atoms in each alkyl.

The materials of the first and second ultrathin membranes may be identical or different.

In the gas-permeable laminate of this invention, the first and second ultrathin membranes composed of the above materials have excellent selectivity for a specific gas. For example, when they show excellent selectivity for oxygen, one of them has a selectivity, defined by the following equation, of at least 2.5.

$$\alpha = \frac{P_{O2}}{P_{N2}} \quad (1)$$

wherein $\alpha$ represents the selectivity, $P_{O2}$ is the oxygen gas permeation coefficient [cc(STP)-cm/cm²-sec-cmHg] and $P_{N2}$ is the nitrogen gas permeation coefficient.

The third ultrathin membrane positioned between the first and second ultrathin membrane layers is made of a material having a higher permeation coefficient with respect to a specific gas than the materials of the first and second ultrathin membranes. When the specific gas is, for example, oxygen, the material is preferably a silicon-containing polymer different from the materials of the first and second ultrathin membranes.

Examples of the silicon-containing polymer include polydimethylsiloxane, polysiloxane/polycarbonate copolymer, polysiloxane/styrene copolymer, polysiloxane/butadiene copolymer, polysiloxane/polyvinyltrimethylsilane copolymer, polymers composed of recurring units of the following formula

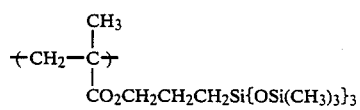

polytetramethyldisiloxane/ethylene copolymer, polydimethylsiloxane/siliphenylene copolymer, polydimethylsiloxane/alkylene oxide copolymers, polysiliphenylene, siloxane-containing polymers having a crosslinked structure such as a crosslinked polymer of oligohydroxystyrene and a siloxane-containing compound having a group reactive with the hydroxyl group of the oligohydroxystyrene and poly(vinylmethyldimethylsiloxane/methyl hydrogen dimethylsiloxane). Of these, polymers having siloxane units are preferred because of their high gas permeability. Examples of such siloxane polymers are polydimethylsiloxane-polybutadiene copolymer, polydimethylsiloxane-polyvinyltrimethylsilane copolymer, and polydimethylsiloxane-polycarbonate copolymer. The third ultrathin membrane may be composed of any of the materials specifically described hereinabove with respect to the first or second ultrathin membrane so long as it is not composed of the same material as the first or second ultrathin film in a specific embodiment.

As long as the third ultrathin membrane is composed of the material having a higher permeability coefficient with respect to the specified gas than the materials of the first and second ultrathin membranes, its selectivity for the specific gas may be higher or lower than the selectivities of the first and second ultrathin films. Preferably, the third ultrathin membrane has a lower selectivity than the first and second ultrathin membranes, and its selectivity as defined by equation (1) above is preferably at least 2.

The first and second ultrathin membranes can be formed, for example, by the coating method, the dipping method, etc. It can be easily formed by applying the methods already proposed by the present inventors and disclosed in Japanese Laid-Open Patent Publications Nos. 92,926/1981 and 71,605/1982. Specifically, a polymer solution having a controlled surface tension and interface tension is fed continuously onto a water surface from a narrow feed opening, for example a syringe, in contact with the water surface and thus spread over the water surface. The solvent is then evaporated to form a thin membrane. The thickness of the membrane can be varied by changing the amount of the polymer solution fed, the speed of spreading it, etc. Usually, it can be varied by changing the polymer concentration of the polymer solution. The membrane thickness can also be adjusted by forming thin membranes in superimposition. The thickness of the first ultrathin membrane may be the same as, or different from, that of the second ultrathin membrane. For example, it is about 0.01 to about 0.2 micrometer, preferably 0.01 to 0.1 micrometer.

The third ultrathin membrane located between the first and second ultrathin membranes can be formed, for example, by the coating method, the water surface spreading method, the blow coating method, the dipping method, etc. For example, the first ultrathin membrane is formed on the porous support to be described below by the above method, then the third ultrathin membrane is formed on the first ultrathin membrane, and further the second ultrathin membrane is formed on the third ultrathin membrane.

The material of the third ultrathin membrane has a higher permeation coefficient with respect to the specific gas than the materials of the first and second ultrathin membranes. For example, the gas permeation coefficient of the third ultrathin membrane is at least twice, preferably at least thrice, that of the material of the first or second ultrathin film. Accordingly, the third ultrathin membrane does not substantially affect the permeating speed of the specific gas even if it is thicker than the first and second ultrathin membranes. The thickness of the third membrane can, for example, be about 0.02 to 1 micrometer. The presence of the third ultrathin membrane greatly increases the mechanical strength of the laminated membrane in the laminate of this invention. In the form of a film, the material of the third ultrathin membrane has a tensile modulus of desirably at least 1.0 kg/cm$^2$, more desirably at least 10 kg/cm$^2$, still more desirably at least 50 kg/cm$^2$.

As stated above, the laminated membrane of the laminate of this invention is formed by laminating at least three ultrathin membranes, and preferably one of the first and second ultrathin membranes having excellent selectivity for the specified gas is in contact with the porous support to be described hereinbelow.

Preferably, the laminated membrane consists of the first, second and third ultrathin membranes, and has a selectivity, as defined by equation (1), of at least 2.8. Preferably, the laminated membrane has a thickness of about 0.04 to 1.4 micrometers.

The gas-permeable laminate of this invention comprises the above laminated membrane and the porous support.

The porous support is used to compensate for the insufficient self-supporting property of the ultrathin membranes in the laminate, and may be a self-supporting porous material having many uniformly distributed pores. Examples of the porous support are Japanese paper, non-woven fabrics, synthetic paper-like sheets, foams, filtration membranes, ultrafiltration membranes and porous films. Preferred are a porous film of polyethylene, a porous film of polypropylene, a cellulosic ultrafiltration membrane, a porous film of polycarbonate, a polyvinyl chloride-type filtration membrane, a polysulfone-type ultrafiltration membrane, an aromatic polyamide-type porous membrane, a polyvinylidene fluoride-type porous membrane, a polytetrafluoroethylene-type porous membrane and a polyacrylonitrile-type porous membrane.

The use of the porous support hampers the smooth passage of a specified gas through the gas-permeable thin membranes owing to its non-porous portion. The amount of a gas permeated through a laminate comprising a porous support and a gas-permeable thin membrane, q (cc/cm$^2$-sec-cmHg), is given by the following equation.

$$q = \frac{p}{\lambda}$$

$$= \frac{p}{\omega \lambda_o + \frac{1-\omega}{2}\left(\sqrt{\gamma^2\left(\frac{1-\omega}{\omega}\right)^2 + \lambda_o^2} + \lambda_o\right)}$$

In the equation, P is the permeation coefficient [cc (STP)-cm/cm$^2$-sec-cmHg] of the gas, $\lambda$ is the average length in cm of the gas passage of the gas-permeable thin membrane, $\lambda_o$ is the thickness in cm of the gas-permeable thin membrane, $\omega$ is the degree of surface opening of the porous support and $2\gamma$ is the average equivalent diameter in cm of the pores of the porous support (see H. Strathman, "Desalination", Volume 35, page 39, 1980).

If the gas-permeable thin membrane of a given material and a given thickness is used, the gas permeation coefficient (P) and the thickness ($\lambda_o$) in the above equation become constant. Hence, the relation between the degree ($\omega$) of surface opening of the porous support and the amount (q) of the gas permeated can be determined by using the average equivalent diameter ($2\gamma$) of the pores of the porous support as a parameter. It can be said in view of this relation that the amount of the gas permeated can be increased by using a porous support having pores with a small average equivalent diameter or a porous support having a large degree of surface opening.

A porous support containing pores having a small average equivalent diameter (preferably not more than 0.08 micrometer) and a large degree of surface opening (preferably 5 to 40%) can be produced, for example, by a wet, dry or semidry-semiwet method from such a material as polysulfone, an aromatic polyamide or polyvinyl fluoride.

By heat-treating the resulting porous membrane in air or in a solvent such as water, the pore diameter and the opening degree of the surface of the porous membrane can be increased. In addition, such heat-treatment can cause removal of the residual solvent or accelerate crystallization of the material of the porous membrane, and therefore can stabilize the porous membrane.

The porous support produced by the above method has the defect that its surface is not smooth owing to the method of its production. When the gas-permeable thin membrane is placed on such a porous support and the gas is sucked, the thin membrane tends to be deformed along the non-smooth surface of the porous support and is very likely to be damaged. Investigations of the present inventors, however, have shown that since the laminated thin membrane composed of at least three layers which is used in this invention has sufficient mechanical strength, it is not substantially damaged by such a porous support having a non-smooth surface, and can permit concentration of a desired gas because of its high selectivity.

The non-smooth surface condition which the laminated membrane composed of the three layers can allow in this invention is such that when, for example, two layers of an ultrathin membrane of poly(4-methylpentene-1) are laminated to a thickness of about 0.03 to 0.05 micrometer onto the above porous support and air is sucked at 20° C. and atmospheric pressure through the two-layer ultrathin membrane from the side of the porous support to reduce the pressure of the atmosphere on the side of the porous support to 160 mmHg, the sucking action causes damage to the two-layer ultrathin membrane and gives oxygen-enriched air having an oxygen concentration of 35% by volume at the highest.

In spite of the fact that the porous support has many very small pores and a large degree of surface opening and therefore is suitable for giving a large amount of gas permeation, it causes, or tends to cause, damage to a gas-permeable ultrathin membrane supported on it because of its non-smooth surface and has difficulty producing oxygen-enriched air having an oxygen concentration exceeding about 40%. By combining it with the laminated membrane of this invention composed of at least three layers and having high mechanical strength as described above, there can be obtained the gas-permeable laminate of this invention having the ability to form an enriched gas having a high concentration of a specific gas, for example having a high oxygen concentration, in a large amount of gas permeation. This is a valuable contribution to the membrane separation technology.

The gas-permeable laminate of this invention may be in the form of a flat film, a hollow yarn, a tube, etc. A flat membrane can be easily obtained by a water surface spreading method by which the thickness of the membrane can be easily controlled and the formation of pinholes can be easily avoided.

A general method of forming the laminate of this invention comprises forming the first layer (may be composed of a plurality of thin membrane layers) on the porous support, then the third interlayer on it, and finally the second layer on the interlayer. Each of the second layer and the interlayer may be composed of a plurality of layers of thin films of the same material.

Since the three membrane layers in the laminate of this invention function integrally, the laminate has excellent gas permeability and selectivity and very high durability. It is used, therefore, to obtain a specific gas in concentrated form from a mixture of at least two gases. For example, it can be used for the production of oxygen-enriched air from atmospheric air, the production of $H_2$-enriched gas from a gaseous mixture of $H_2$ and CO, the removal of $H_2O$ from a gaseous mixture containing $H_2O$, removal of $SO_2$ and/or $NO_x$ from a gaseous mixture containing $SO_2$ and/or nitrogen oxides ($NO_x$), and the production of He-enriched gas from a gaseous mixture containing He.

It is especially preferably used to produce oxygen-enriched air (for example, containing about 30 to about 45% oxygen) from atmospheric air.

The following Examples illustrate the present invention in more detail.

The performances of the thin polymeric membranes are expressed by the ratio of the oxygen permeation coefficient to the nitrogen permeation coefficient (to be referred to hereinbelow as the selectivity). These permeation coefficients were measured by a gas permeability measuring device (3BR-SSS made by Rika Seiki Co., Ltd.).

REFERENTIAL EXAMPLE 1

A solution composed of 15 parts by weight of polysulfone and 85 parts by weight of N-methylpyrrolidone was cast in a layer form having a thickness of about 0.3 mm on a dense Dacron nonwoven fabric (basis weight 180 g/m$^2$), and immediately then, the polysulfone layer was gelled in a water bath at room temperature to obtain a nonwoven fabric-reinforced polysulfone porous membrane.

The resulting porous membrane had an average surface pore diameter of 0.012 micrometer and an average degree of opening of 16.3% when they were measured by observing a scanning electron micrograph of its surface. The porous membrane had an air permeation speed at 23° C. of $1-2\times10^{-2}$ cc/cm$^2$-sec-cmHg.

To examine the suitability of this porous membrane as a support for a separation membrane, the following test was conducted.

A solution composed of 3 parts by weight of poly(4-methylpentene-1) (Grade DX 845, a product of Mitsui Petrochemical Industries, Ltd.; oxygen permeation coefficient $2\times10^{-9}$ cc-cm/cm$^2$-sec-cmHg), 3 parts by weight of cyclohexenyl hydroperoxide and 94 parts by weight of cyclohexene was maintained at 30° C., and continuously fed onto a water surface kept at 5° C. at a flow rate of 60 cc/min. from the tip of an injection syringe having a diameter of 0.8 mm while maintaining the syringe tip in contact with the water surface. The polymer solution spread on the water surface, and the solvent and the additive gradually vanished by evaporation or dissolution in water. As a result, a thin polymeric membrane formed on the water surface.

At a site 60 cm away from the syringe tip, the formed thin membrane was continuously pressed against the polysulfone porous membrane produced as above and thus pulled up onto the polysulfone porous membrane.

The thickness of the thin polymeric film, calculated from the amount of the polymer solution fed and its extent of spreading, was 0.017 micrometer.

In the same way as above, the poly(4-methyl-pentene-1) membrane was laminated once more onto the above composite. By using the resulting laminate, air was sent to the polymeric membrane side of the laminate, and its porous support side was maintained at a reduced pressure of 160 torr. Under these conditions, the laminate was subjected to an air separation test. Oxygen-enriched air having an oxygen concentration of 34.8% was obtained at a rate of 11.3 liters/m3-min.

REFERENTIAL EXAMPLE 2

A solution composed of 15 parts by weight of poly(m-phenylene isophthalamide) and 85 parts by weight of N-methylpyrrolidone was cast in a layer form having a thickness of 0.3 mm on a dense Dacron nonwoven fabric (basis weight 180 g/m$^2$) and immediately then, the polyamide layer was gelled in a water bath at room temperature to obtain a nonwoven fabric-reinforced aromatic polyamide porous membrane. The resulting membrane had a surface pore diameter of 0.015 micrometer and an average degree of opening of 17.2% when they were measured by observing a scanning electron micrograph of its surface as in Referential Example 1.

A thin membrane (0.034 micrometer in thickness) of poly(4-methylpentene-1) was laminated to the resulting aromatic polyamide porous membrane in the same way as in Referential Example 1, and the laminate was subjected to the same air separation test as in Referential Example 1. There was obtained oxygen-enriched air having an oxygen concentration of only 28.9%.

REFERENTIAL EXAMPLE 3

A solution composed of 16 parts by weight of polyvinylidene fluoride resin (Kynar 301F, a product of Penwalt Co.) and 84 parts by weight of dimethyl sulfoxide was cast in a layer form having a thickness of 0.35 mm on a dense Dacron nonwoven fabric (basis weight 180 g/m$^2$), and immediately then, the polyvinylidene fluoride layer was gelled in a water bath to obtain a nonwoven fabric-reinforced polyvinylidene fluoride porous membrane having an average surface pore diameter of 0.15 micrometer and an average degree of opening of 15.4%.

A thin membrane (0.034 micrometer in thickness) of poly(4-methylpentene-1) was laminated to the resulting polyvinylidene fluoride porous membrane in the same way as in Referential Example 1, and the resulting laminate was subjected to the same air separation test as in Referential Example 1. There was obtained oxygen-enriched air having an oxygen concentration of only 31.8%.

EXAMPLE 1

(1) A solution consisting of 2.5 parts by weight of poly(methylhexene-allyltrimethylsilane) copolymer (methylhexene 55 mole %; oxygen permeation coefficient $4.5 \times 10^{-9}$ cc-cm/cm$^2$-sec-cmHg; $\alpha$ 3.6), 2.5 parts by weight of cyclohexenylhydroperoxide and 95 parts by weight of cyclohexene was maintained at 30° C. and continuously fed onto a water surface kept at 5° C. from the tip of a syringe having a diameter of 0.8 mm at a flow rate of 60 cc/min. while maintaining the syringe tip in contact with the water surface. The polymer solution spread over the water surface. The solvent gradually vanished by evaporation or dissolution in water and a thin membrane formed on the water surface.

The resulting thin membrane was pulled up onto the porous polysulfone membrane (a porous support) produced in Referential Example 1 by continuously pressing the polysulfone membrane onto the thin membrane at a site 60 cm apart from the syringe tip. Thus, a first layer was formed.

The thickness of the thin film calculated from the amount of the polymer solution supplied and the extent of its spreading was 0.014 micrometer.

(2) A solution composed of 8 parts by weight of polydimethylsiloxane-polybutadiene copolymer (oxygen permeation coefficient $1.5 \times 10^{-8}$ cc-cm/cm$^2$-sec-cmHg; $\alpha$ 2.0), 5 parts by weight of cyclohexenyl hydroperoxide and 87 parts by weight of benzene was continuously fed onto a water surface to form a thin film of the polydimethyl-siloxane-polybutadiene copolymer on the water surface. The thin film was laminated to the first layer by pressing it onto the side of the first layer of the polysulfone porous membrane supporting the first layer in the same way as above.

In the same way, a membrane of the polydimethylsiloxane-polybutadiene copolymer was again laminated onto the above copolymer membrane. The thickness of the interlayer calculated from the amount of the polymer solution fed and the extent of its spreading was 0.097 micrometer (3) On the interlayer was formed a second layer of poly(methylhexene-allyltrimethylsilane)copolymer having a thickness of 0.014 micrometer from the same polymer solution as used in preparing the first layer, in the same way as above.

Air was sent to the membrane side of the resulting laminate to reduce the pressure on the side of the porous support to 50 torr, and an air separation test was carried out. Oxygen-enriched air having an oxygen concentration of 42.1% was obtained at a rate of 9.6 liters/m$^2$-min.

COMPARATIVE EXAMPLES 1-4

The various membranes shown in Table 1 were laminated by using the same polysulfone porous support as used in Example 1. An air separation test was carried out at 50 torr in the same way as in Example 1 by using the resulting laminates. The results are shown in Table 1.

TABLE 1

| | Structure of the laminate (*1) | | | Results of the air separation test | |
|---|---|---|---|---|---|
| Run No. | First layer | Interlayer | Second layer | O$^2$ concentration (%) | Amount of oxygen enriched air (liters/m$^2$-min.) |
| Example 1 | PMA (*2) (0.014) | PSi (*3) (0.097) | PMA (0.014) | 42.1 | 9.6 |
| Comparative Example 1 | PMA (0.028) | — | — | 30.4 | 32.3 |
| Comparative Example 2 | PSi (0.097) | PMA (0.028) | — | 37.1 | 18.9 |
| Comparative Example 3 | PMA (0.028) | PSi (0.097) | — | 37.9 | 11.3 |
| Comparative Example 4 | PSi (0.049) | PMA (0.028) | PSi (0.049) | 36.9 | 21.2 |

(*1) The laminate consisted of the porous support, the first layer, the interlayer and the second layer in this order. The parenthesized figures show thicknesses in micrometers.
(*2) PMA stands for poly(methylhexene-allyltrimethylsilane).
(*3) PSi stands for polydimethylsiloxane-polybutadiene copolymer.

It is clear from Comparative Example 1 that when the gas-permeable membrane is composed only of PMA, it breaks, and the concentration of oxygen in the permeated air is not on the level which can inherently be attained by this membrane. When the PSi membrane is superimposed on it (Comparative Example 3), the oxygen concentration in the permeated air increases a little, but is not on the inherent level as in Example 1. With the structures in which PSi is directly laminated to the support (Comparative Examples 2 and 4), the inherent performance of PMA is not achieved.

EXAMPLE 2

A solution composed of 1.5 parts by weight of poly(2,6-dimethyl phenylene oxide) ($PO_2 1.5 \times 10^{-9}$ cc-cm/cm$^2$-sec-cmHg; $\alpha$ 4.1), 1.5 parts by weight of cyclohexenyl hydroperoxide and 97 parts by weight of trichloroethylene was maintained at 50 °C., and continuously fed from the tip of an injection syringe having a diameter of 0.8 mm at a rate of 60 cc/min. onto a water surface kept at 5 °C. while maintaining the syringe tip in contact with the water surface. Thus, a thin membrane of poly(2,6-dimethyl phenylene oxide) was formed on the water surface.

The resulting thin membrane was pulled up onto the porous polysulfone membrane produced in Referential Example 1 by continuously pressing the thin membrane onto the polysulfone membrane at a site 60 cm apart from the syringe tip. Thus, a first layer was formed. The thickness of the first layer membrane was calculated as 0.011 micrometer.

Then, a solution composed of 7 parts by weight of polydimethylsiloxane-polybutadiene copolymer (tensile modulus 318 kg/cm$^2$; $PO_2 1.5 \times 10^{-8}$ cc-cm/cm$^2$-sec-cmHg; $\alpha$ 2.0), 5 parts by weight of cyclohexenyl hydroperoxide and 88 parts by weight of benzene was similarly fed continuously onto a water surface to form a thin membrane of the polydimethylsiloxane-polybutadiene copolymer on the water surface. Two such thin membranes of this copolymer were laminated onto the first layer to form an interlayer having a calculated thickness of 0.10 micrometer.

Furthermore, a second layer (thickness 0.011 micrometer) of the same poly(2,6-dimetylphenylene oxide) as described above was provided on the interlayer.

The same air separation test as in Example 1 was carried out at 160 torr by using this laminate. Oxygen-enriched air having an oxygen concentration of 40.1% was obtained.

For comparison, the same air separation test as above was carried out by using a thin membrane (0.022 micrometer) of poly(2,6-dimethylphenylene oxide) on the porous support without the interlayer of polydimethyl-siloxane-polybutadine copolymer. Oxygen-enriched air having an oxygen concentration of only 29.2% was obtained.

EXAMPLE 3

By the same method as in Example 2, a laminate was prepared which consisted of a first and a second layer (thickness 0.015 micrometer) of a thin membrane of polyvinyltrimethylsilane (oxygen permeation coefficient $1.5 \times 10^{-9}$ cc-cm/cm$^2$-sec-cmHg; $\alpha$ 4.0), an interlayer (0.20 micrometer) of polydimethylsiloxane-polybutadiene copolymer and the polysulfone porous membrane produced in Referential Example 1 as a support.

An air separation test was carried out at 50 torr by using the resulting laminate. Oxygen-enriched air having an oxygen concentration of 45.1% was obtained.

EXAMPLE 4

A thin membrane (the first layer, thickness 0.017 micrometer) of poly(4-methylpentene-1) was prepared by the same method as in Referential Example 1 and laminated to the polysulfone porous membrane obtained in Referential Example 1. Then, a solution composed of 8 parts by weight of polydimethylsiloxane-polycarbonate copolymer (siloxane content 60 mole %; $PO_2 2 \times 10^{-8}$ cc-cm/cm$^2$-sec-cm; $\alpha$ 2.2; tensile modulus 260 kg/cm$^2$), 5 parts by weight of cyclohexenyl hydroperoxide, and 87 parts by weight of benzene was spread onto a water surface to form a thin film of the copolymer, and laminated to the outside surface of the first layer. The same thin membrane was laminated again to form an interlayer having a thickness of 0.108 micrometer. Then, a thin film (second layer) having a thickness of 0.017 micrometer of poly(4-methylpentene-1) was laminated onto the outside surface of the interlayer to form a laminate.

Air was sent to the membrane side of the resulting laminate to reduce the pressure on the side of the porous support to 160 torr, and a separation test on air was carried out. Oxygen-enriched air having an oxygen concentration of 41.5% was obtained at a rate of 4.1 liters/m$^2$-min. When sucking was carried out continuously for 10 hours, oxygen-enriched air having the same oxygen concentration was obtained at the same rate.

COMPARATIVE EXAMPLES 5-8

The membranes shown in Table 4 were laminated onto the same porous polysulfone support as used in Example 4 by the same method as in Example 1. Air was separated by using the resulting laminate in the same way as in Example 4. The results are shown in Table 2.

TABLE 2

| Run No. | Structure of the laminate (*1) | | | Results of the air separation test (*4) | |
|---|---|---|---|---|---|
| | First layer | Interlayer | Second layer | $O^2$ concentration (%) | Amount of oxygen enriched air (liters/m$^2$-min.) |
| Example 4 | PMP (*2) (0.017) | PS-PC (*3) (0.108) | PMP (0.017) | 41.5 (46.2) | 4.1 (5.4) |
| Comparative Example 5 | PMP (0.034) | — | — | 34.8 (35.9) | 11.3 (13.7) |
| Comparative Example 6 | PS-PC (0.108) | PMP (0.034) | — | 37.7 (39.9) | 7.3 (10.1) |
| Comparative Example 7 | PMP (0.034) | PS-PC (0.108) | — | 38.4 (40.9) | 4.7 (6.7) |
| Comparative | PS-PC | PMP | PS-PC | 36.8 | 10.1 |

TABLE 2-continued

| | Structure of the laminate (*1) | | | Results of the air separation test (*4) | |
|---|---|---|---|---|---|
| | | | | | Amount of oxygen |
| Run No. | First layer | Interlayer | Second layer | $O^2$ concentration (%) | enriched air (liters/m²-min.) |
| Example 8 | (0.054) | (0.034) | (0.054) | (39.2) | (13.3) |

(*1) The laminate consisted of the porous support, the first layer, the interlayer and the second layer in this order. The parenthesized figures show thicknesses in micrometers.
(*2) PMP stands for poly(4-methylpentene-1).
(*3) PS-PC stands for polydimethylsiloxane-polycarbonate.
(*4) The parenthesized figures are the results obtained at 50 torr.

EXAMPLE 5

A laminate having the same structure as in Example 4 was produced as in Example 1 except that the thickness of each of the first and second layers of poly(4-methylpentene-1) was changed to 0.012 micrometer. The same air separating experiment as in Example 4 was performed on the resulting laminate. Oxygen-enriched air having an oxygen concentration of 40.5% was obtained at a rate of 4.6 liters/m²-min.

COMPARATIVE EXAMPLE 9

A solution composed of polydimethylsiloxane modulus less than 0.1 kg/cm², benzene and cyclo(tensile hexenylhydroperoxide was spread onto a water surface to form a membrane (thickness about 0.2 micrometer). Using this membrane as an interlayer, a laminate was produced as in Example 5 (the first and second layers of this laminate were membranes of poly(4-methylpentene-1) each having a thickness of 0.012 micrometer).

In the same way as in Example 5, the resulting laminate was subjected to an air separation test. The oxygen concentration was 20.9%, and the separation failed. It was found that the laminated membrane was broken.

EXAMPLE 6

In the same way as in Example 4, a laminate was produced which consisted of a first and a second layer of a thin membrane of poly(4-methylpentene-1) (0.03 micrometer), an interlayer of a thin membrane of polysiliphenylene having a thickness of 0.15 micrometer (tensile modulus 500 kg/cm², oxygen permeation coefficient $8 \times 10^{-9}$ cc-cm/cm²-sec-cmHg) and the same porous polysulfone membrane as used in Referential Example 1 as a support.

The resulting laminate was subjected to an air separation test at a reduced pressure of 50 torr. Oxygen-enriched air having an oxygen concentration of 45.8% was obtained.

EXAMPLE 7

In the same way as in Example 4, a laminate was produced which consisted of a first and a second layer of a thin membrane of poly(4-methylhexene-1) (oxygen permeation coefficient $2.5 \times 10^{-9}$ cc-cm/cm²-sec-cmHg) having a thickness of 0.03 micrometer, and an interlayer of a thin membrane of a copolymer of hydroxystyrene oligomer and dichlorodimethylsiloxane having a thickness of 0.15 micrometer (tensile modulus 150 kg/cm²; oxygen permeation coefficient $2 \times 10^{-8}$ cc-cm/cm²-sec-cmHg, α 2.0) and the same porous polysulfone membrane as used in Referential Example 1 as a support.

The resulting laminate was subjected to an air separation test at a reduced pressure of 50 torr. Oxygen-enriched air having an oxygen concentration of 45.5% was obtained.

EXAMPLE 8

A solution composed of 3 parts by weight of poly(methyltrimethylsilylacetylene) ($PO_2 2 \times 10^{-8}$ cc-cm/sec-cm²-cmHg; α 3.3), 2 parts by weight of cyclohexenyl hydroperoxide and 95 parts by weight of toluene was spread on a water surface to form a thin membrane of poly(methyltrimethylsilylacetylene) having a thickness of 0.015 micrometer.

A laminate was prepared which consisted of a first and a second layer of the thin membrane of poly(methyltrimethylsilylacetylene), an interlayer (thickness 0.108 micrometer) composed of two thin membranes of polydimethylsiloxane-polycarbonate copolymer, and the aromatic polyamide porous support produced in Referential Example 2.

The resulting laminate was subjected to an air separation test at a reduced pressure of 50 torr. Oxygen-enriched air having an oxygen concentration of 39.2% was obtained.

EXAMPLE 9

A laminate was produced which consisted of a first and a second layer, each having a thickness of 0.012 micrometer, of poly(4-methylpentene-1), an interlayer of a thin membrane of poly(methyltrimethylsilylacetylene) having a thickness of 0.079 micrometer and the aromatic polyamide porous support obtained in Referential Example 2.

The laminate was subjected to an air separation test at a reduced pressure of 50 torr. Oxygen-enriched air having an oxygen concentration of 47.5% was obtained.

EXAMPLE 10

A laminate was produced by laminating a first layer of a thin membrane of poly(allyl t-butyldimethyl-silane-allyltrimethylsilane) copolymer (allyl t-butyldimethylsilane 30 mole %, $PO_2 6.1 \times 10^{-9}$ cc-cm/cm²-sec-cmHg; α 3.2), an interlayer of polydimethylsiloxane-polyvinyltrimethylsilane copolymer (dimethylsiloxane content 70 mole %; $PO_2 1.4 \times 10^{-8}$ cc-cm/cm²-sec-cmHg; α 2.4) having a thickness of 0.10 micrometer, and a second layer of the same thin membrane as the first layer in this order onto the polyvinylidene fluoride porous support obtained in Referential Example 3.

The resulting laminate was subjected to an air separation under a reduced pressure of 50 torr. Oxygen-enriched air having an oxygen concentration of 39.7% was obtained.

A laminate was also prepared by laminating the above first and second layers on the polyvinylidene fluoride porous support without using the interlayer. The laminate was subjected to the same air separation test. There was only obtained air having an oxygen concentration of 24.1%.

EXAMPLE 11

A laminate was produced by laminating a first layer of a thin membrane (0.012 micrometer) of the same poly(allyl t-butyldimethylsilane/allyltrimethylsilane) copolymer as used in Example 10, an interlayer of a thin membrane (thickness 0.075 micrometer) of the same poly(dimethylsiloxane-polyvinyltrimethylsilane) copolymer as used in Example 10 and a second layer of a thin membrane (thickness 0.012 micrometer) of poly(4-methylpentene-1) in this order to the polyvinylidene fluoride porous support obtained in Referential Example 3.

The resulting laminate was subjected to an air separation est under a reduced pressure of 50 torr. Oxygen-enriched air having an oxygen concentration of 42.6% was obtained.

EXAMPLE 12

In the same way as in Referential Example 1, a solution composed of 15 parts by weight of polysulfone and 85 parts by weight of N-methylpyrrolidone was cast in a layer form having a thickness of about 0.200 micrometer on a dense Dacron nonwoven fabric, and the polysulfone layer was immediately gelled in a water bath to form a polysulfone porous membrane. Then, the polysulfone porous membrane was washed with water at room temperature and then in hot water at 95° to 100° C.

By observing a scanning electron micrograph of its surface, the porous membrane was found to have an average pore diameter of 0.015 micrometer and an average degree of opening of 22%.

Two layers of a thin membrane of poly(4-methyl-pentene-1) having a thickness of 0.024 micrometer were laminated onto the polysulfone porous membrane.

The resulting laminate was subjected to an air separation test under a reduced pressure of 160 torr. Oxygen-enriched air having an oxygen concentration of only 28.7% was obtained.

In the same way as in Example 4, a laminate was produced by laminating a first layer of a thin membrane (thickness 0.017 micrometer) of poly(4-methylpentene-1), an interlayer of a thin membrane (thickness 0.108 micrometer) of polydimethylsiloxane-polycarbonate copolymer and a second layer of a thin membrane (thickness 0.024 micrometer) of poly(4-methylpentene-1) in this order to the above polysulfone porous support. The laminate was put in a hot air dryer at 80° C. and heat-treated for 3 hours while the pressure of that side of the porous support of the laminate was reduced to 160 to 200 torr.

The resulting laminate was subjected to the same air separation test as in Example 4 at 50 torr. Oxygen-enriched air having an oxygen concentration of 46.5% was obtained. When the air separation test was continued for 3 months, oxygen-enriched air having the same oxygen concentration was obtained at the same rate.

EXAMPLE 13

A thin membrane (thickness 0.033 micrometer) of the same poly(allyl t-butyldimethylsilane-allyltrimethylsilane) copolymer as used in Example 10 was laminated as a first layer onto the polysulfone porous support.

A hexane-toluene solution (solids concentration 1.0% by weight) of room-temperature curable silanol-terminated polydimethylsiloxane (average molecular weight 100,000), tetraethoxysilane and as a catalyst alkoxytitanium acetylacetone chelate (after curing, the polydimethylsiloxane film had a $P_{O_2}$ of $2.3 \times 10^{-8}$ cc/cm$^2$-sec-cmHg and an $\alpha$ of 2.0) was poured onto the outside of the first layer, and the excessive solution was immediately removed The coating was then cured at room temperature for 24 hours to form a thin membrane of polydimethylsiloxane. The thickness of the polydimethylsilicone membrane, measured by observation of an electron micrograph of its cut section, was 0.2 to 0.25 micrometer.

Thereafter, a thin membrane (thickness 0.033 micrometer) of poly(allyl-t-butyldimethylsilane-allyl-trimethylsilane) was laminated to the outside of the polydimethylsiloxane membrane to form a laminate.

The resulting laminate was subjected to the same air separation test as in Example 10 under a reduced pressure of 50 torr. Oxygen-enriched air having an oxygen concentration of 40.1% was obtained.

EXAMPLE 14

A laminate was produced in the same way as in Example 4 from the polysulfone porous support obtained in Referential Example 1, a first and a second layer of a membrane (thickness 0.024 micrometer) of poly(t-butylacetylene) ($P_{O_2}$ $1.0 \times 10^{-9}$ cc-cm/cm$^2$-sec-cmHg; $\alpha$ 3.9), and an interlayer of a thin membrane (thickness 0.11 micrometer) of polysiliphenylene-polydimethylsiloxane copolymer ($P_{O_2}$ $1.1 \times 10^{-8}$ cc-cm/cm$^2$-sec-cmHg; $\alpha$ 2.1).

The laminate was subjected to the same air separation test as in Example 4 under a reduced pressure of 160 torr. Oxygen-enriched air having an oxygen concentration of 40.3% was obtained.

For comparison, a laminate composed of the above support and the first and second layer without the interlayer was produced and subjected to the same air separation test. Oxygen-enriched air having an oxygen concentration of only 25.4% was obtained.

What is claimed is:

1. A gas-permeable laminate for separating a specific gas from a gaseous mixture comprising a gas-permeable membrane having excellent selectivity for the specified gas and a porous support supporting said membrane thereon, said gas-permeable membrane being a multilayer laminated membrane comprising at least a first and a second ultrathin membrane having excellent selectivity for the specified gas and a third ultrathin membrane of a different material from the materials of the first and second ultrathin membranes and located between the first and second ultrathin membranes, wherein one of the first and second ultrathin membranes is in contact with the porous support, the material of the third ultrathin membrane has a higher permeation coefficient with respect to the specified gas than the materials of the first and second ultrathin membranes, said porous support has substantially no gas-separating ability in the form of said gas-permeable laminate, at least one of the first and second ultrathin membranes has a selectivity, defined by the following equation, of at least 2.5:

$$\alpha = \frac{P_{O_2}}{P_{N_2}} \qquad (1)$$

wherein α represents the selectively, $P_{O_2}$ is the oxygen gas permeation coefficient [cc(STP)-cm/cm²-sec-.cmHg]and $P_{N_2}$ is the nitrogen gas permeation coefficient, the selectivity of the third ultrathin membrane is at least 2 but is lower than that of each of the first and second ultrathin membranes, and the selectivity of the laminated membrane is at least 2.8.

2. The laminate of claim 1 wherein the gas-permeable membrane is of a three-layer structure consisting only of the first, second and third membrane.

3. The laminate of claim 1 wherein the porous support has a non smooth surface condition such that when two layers of an ultrathin membrane of poly(4-methylpentene-1) are laminated to a thickness of about 0.03 to 0.05 micrometer onto the above porous support and air is sucked at 20° C. and atmospheric pressure through the two-layer ultrathin membrane from the side of the porous support to reduce the pressure of the atmosphere on the side of the porous support to 160 mmHg, the sucking action causes damage to the two-layer ultrathin membrane and gives oxygen-enriched air having an oxygen concentration of 35% by volume at the highest.

4. The laminate of claim 1 wherein at least one of the first and second ultrathin membranes has a thickness of about 0.01 to 0.2 micrometer.

5. The laminate of claim 1 wherein the third ultrathin membrane has a thickness of about 0.02 to 1 micrometer.

6. The laminate of claim 1 wherein the laminated membrane composed of the first, second and third ultrathin membranes has a thickness of about 0.04 to 1.4 micrometers.

7. The laminate of claim 1 wherein the pores of the porous support have an average equivalent diameter of not than 0.08 micrometer.

8. The laminate of claim 1 wherein the porous support has a degree of surface opening of 5 to 40%.

9. The laminate of claim 1 wherein the first and second ultrathin membranes are produced from an addition polymer of at least one unsaturated compound selected from hydrocarbon compounds and silane compounds having a polymerizable carbon-carbon double or triple bond.

10. The laminate of claim 1 wherein the third ultrathin membrane is produced from a member selected from the group consisting of polydimethylsiloxane, a polysiloxane/polycarbonate copolymer, a polysiloxane/styrene copolymer, a polysiloxane/polybutadiene copolymer, a polysiloxane/polyvinyltrimethylsilane copolymer, a polytetramethyldisiloxane/ethylene copolymer, a polydimethylsiloxane/siliphenylene copolymer, a polydimethylsiloxane/alkylene oxide copolymer, polysiliphenylene, a crosslinked polymer of oligohydroxystyrene and siloxane having a group reactive with the hydroxyl group of the oligohydroxystyrene, and poly(vinylmethyldimethylsiloxane/methyl hydrogen dimethylsiloxane).

11. A gas-permeable laminate for separating a specific gas from a gaseous mixture comprising a gas-permeable membrane having excellent selectivity for the specified gas and a porous support supporting said membrane thereon, said gas-permeable membrane being a multi-layer laminated membrane comprising at least a first and a second ultrathin membrane having excellent selectivity for the specified gas and a third ultrathin membrane of a different material from the materials of the first and second ultrathin membranes and located between the first and second ultrathin membranes, wherein the first and second ultrathin membranes are produced from an addition polymer of at least one unsaturated compound selected from the group consisting of hydrocarbon compounds and silane compounds having a polymerizable carbon-carbon double or triple bond, the third ultrathin membrane is produced from a member selected from the group consisting of polydimethylsiloxane, a polysiloxane/polycarbonate copolymer, a polysiloxane/styrene copolymer, a polysiloxane/polybutadiene copolymer, a polysiloxane/polyvinyltrimethylsilane copolymer, a polytetramethyldisiloxane/ethylene copolymer, a polydimethylsiloxane/siliphenylene copolymer, a polydimethylsiloxane/alkylene oxide copolymer, polysiliphenylene, a crosslinked polymer of oligohydroxystyrene and siloxane having a group reactive with the hydroxyl group of the oligohydroxystyrene, and poly(vinylmethyldimethylsiloxane/methyl hydrogen dimethylsiloxane), the material of the third ultrathin membrane has a higher permeation coefficient with respect to the specified gas than the materials of the first and second ultrathin membrane, and said porous support has substantially no gas-separating ability in the form of said gas-permeable laminate.

* * * * *